Figure 1:
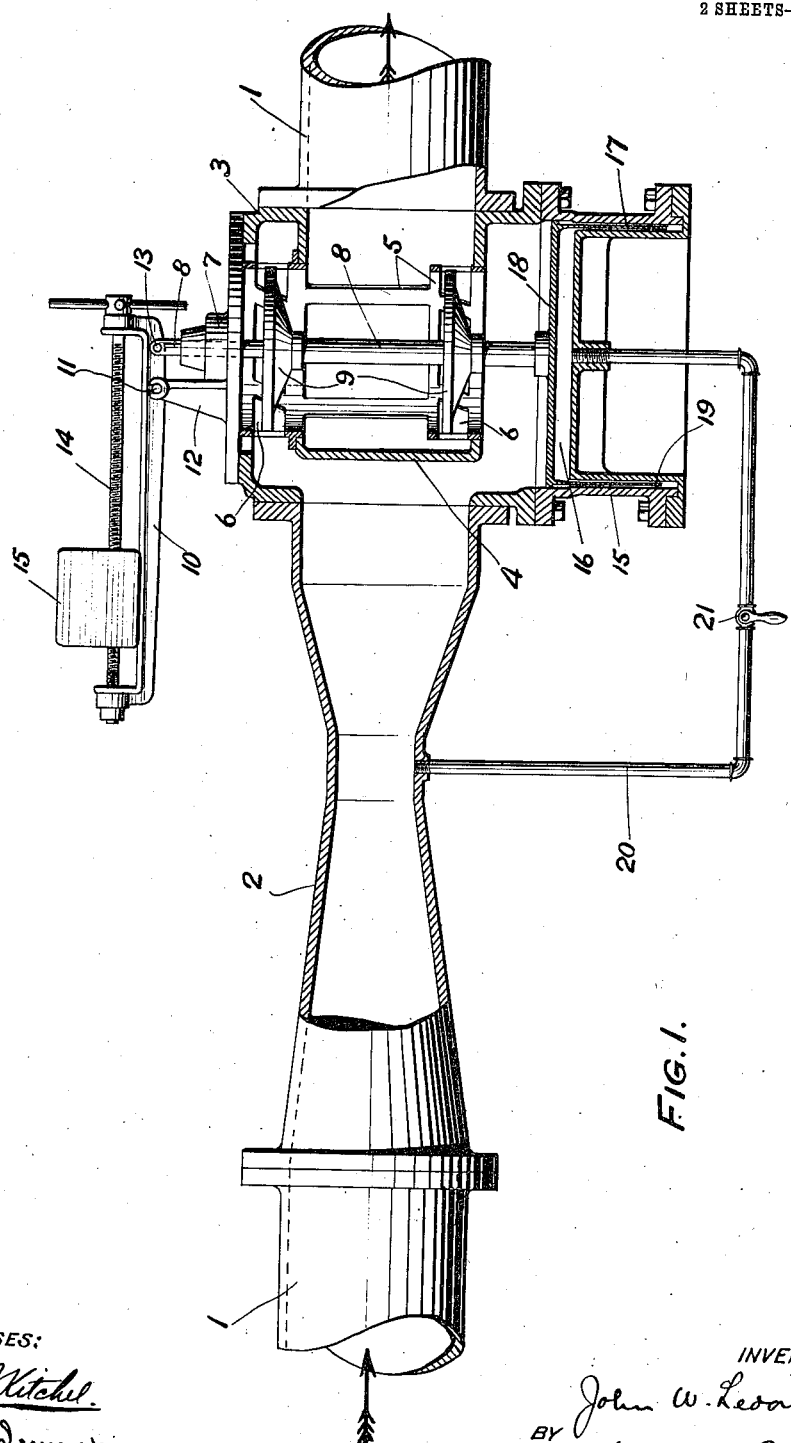

J. W. LEDOUX.
LIQUID FLOW CONTROLLER.
APPLICATION FILED NOV. 2, 1908.

950,208.

Patented Feb. 22, 1910.
2 SHEETS—SHEET 1.

WITNESSES:

INVENTOR
John W. Ledoux
BY
Charles N. Butler
ATTORNEY

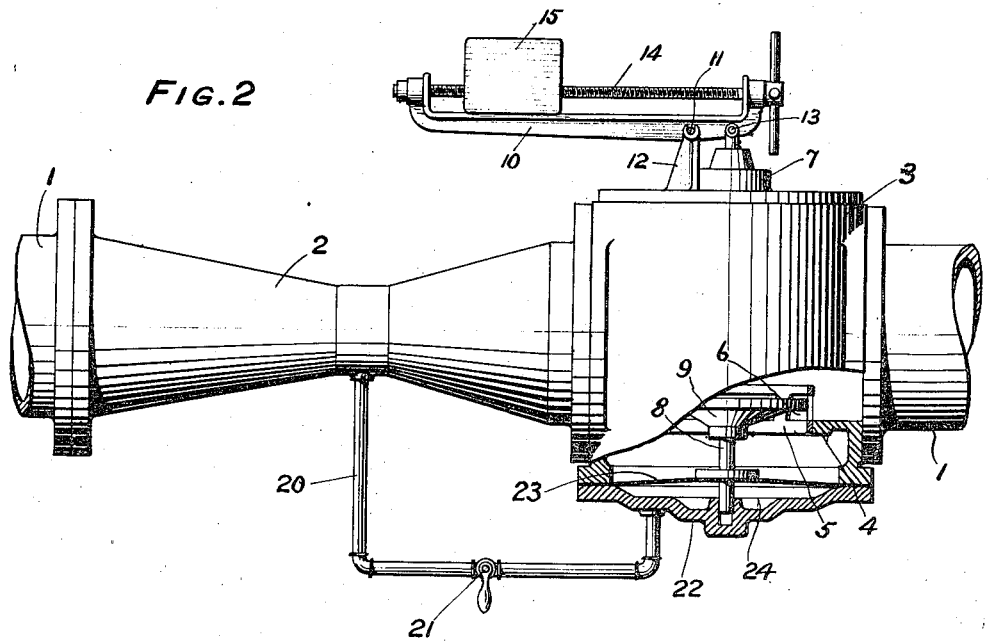
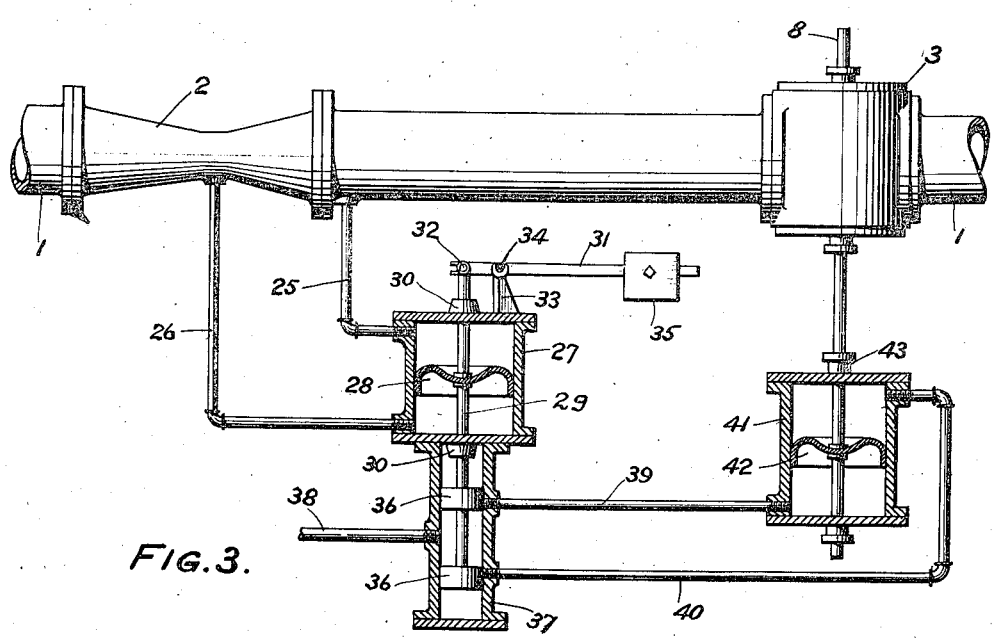

UNITED STATES PATENT OFFICE.

JOHN W. LEDOUX, OF SWARTHMORE, PENNSYLVANIA.

LIQUID-FLOW CONTROLLER.

950,208.   Specification of Letters Patent.   Patented Feb. 22, 1910.

Application filed November 2, 1908. Serial No. 460,671.

*To all whom it may concern:*

Be it known that I, JOHN W. LEDOUX, a citizen of the United States, residing at Swarthmore, in the county of Delaware and State of Pennsylvania, have invented certain Improvements in Liquid-Flow Controllers, of which the following is a specification.

This invention is a liquid flow controller comprising improved means for automatically operating a valve which regulates the flow.

The characteristic features of the improvements are disclosed in the accompanying drawings and the following description thereof.

In the drawings, Figure 1 is a sectional elevation representing a form of my improvements; Fig. 2 is a sectional elevation representing a further form thereof; and Fig. 3 is a sectional elevation representing an additional modification.

A conduit, comprising the normal sections 1 and the Venturi section 2, has, in a normal section, a valve comprising a casing 3 with the diaphragm 4 therein, extending through the diaphragm a cylindrical liner 5 with the two sets of ports 6 providing passages therethrough, extending through the liner and upwardly through the casing stuffing box 7 a stem 8, and fixed on the stem the puppets 9 which control the respective sets of ports.

A beam 10 is supported by a pivotal bearing 11, on a strut or bracket 12 carried by the valve casing, and is connected by the pivotal bearing 13 with the top of the stem 8, the beam having the swiveled screw 14 and the weight 15 thereon balancing the movable parts of the valve mechanism.

In the construction illustrated in Fig. 1, the casing 3 has fixed to and communicating with the bottom thereof an auxiliary casing 15 containing the cylindrical chamber 16 and extending downwardly therefrom the cylindrical channel 17.

Fixed to the lower end of the stem is a diaphragm or piston comprising the circular head 18, fixed to the lower end of the stem 8, within the chamber 16, and depending from the head the cylindrical apron 19 fitting within the channel 17. A pipe 20, containing the valve 21, connects the chamber 16, beneath the head 18, with the throat of the Venturi section 2.

The channel 15 contains a heavy liquid, such as mercury, in which the apron 19 is submerged and the passage of a lighter liquid, as water flowing in the conduit, from one to the other side of the diaphragm or piston is prevented by the seal thus formed.

In operation, the balance is set so that when the flow through the conduit is at the minimum the puppets will be elevated to secure the maximum port openings. As the flow increases the puppets will be carried down gradually to gradually close the ports by reason of the gradually increasing resultant pressure acting to carry the piston down; the pressure communicated to the lower side of the piston from the Venturi section becoming less than the pressure on the upper side of the piston communicated from a normal section of the conduit as the velocity of flow increases.

The construction illustrated in Fig. 2 has secured to the walls of the casing 3 by the bottom plate or closure 22 the edges of a flexible diaphragm 23, the center of which is fixed to the stem 8. A chamber 24, formed by the parts 22 and 23, is connected by the pipe 20 with the Venturi section so that the diaphragm is subject to the differential pressure resulting from the different pressures communicated to its opposite sides from above and below which differential or resultant pressure increases with the increase of the velocity of flow and closes the valve proportionately.

The construction illustrated in Fig. 3 has normal and contracted sections of the conduit respectively connected by pipes 25 and 26 with opposite ends of a chamber or cylinder 27 containing the piston or diaphragm 28 disposed between the pipes. A stem 29 is fixed to the part 28 and extends through and acts in the stuffing boxes 30 in the heads of the chamber. The upper end of the stem is connected with a beam 31 by a pivotal bearing 32, the beam being supported on the strut or bracket 33 by the pivotal bearing 34 and having a weight 35 for counter-balancing the mechanism carried by the stem. The lower end of the stem has thereon the pistons 36 acting in a cylinder 37 which has the pipes 38, 39 and 40 connected therewith, the pistons serving as a valve or valves for establishing communication by the pipe 38 with the pipes 39 and 40 alternatively. The pipes 39 and 40 are connected with opposite ends of a cylinder or chamber 41 containing a diaphragm or piston 42 between the pipes, the part 42 being fixed to an extension of the valve stem 8 which acts through the stuffing box 43 in the head of the chamber 41. The pressures acting from the normal section 1 and the contracted section 2 of the conduit through the pipes 25 and 26 on opposite sides of the part 28 will be equal when the flow is zero, but as the rate of flow increases there is an increasing difference between these pressures which moves the part 28 from its upper position (holding the pistons 36 in position to establish communication between the pipes 38 and 39) toward its lower position, to establish communication between the pipes 38 and 40. In the upper position of the piston 36 pressure is communicated to the lower end of the chamber 41 to lift the part 42 which acts to open the valve contained in the casing 3. In the lower position of these pistons pressure is communicated to the upper end of the chamber 41 and acts on the part 42 to effect the closure of the valve in the casing 3. It will be understood that the pistons 36 are arranged so that the pipes 39 and 40 will be partially or wholly uncovered, depending upon the resultant pressure acting on the part 28, and depending thereon will be the extent of the movement of the part 42 and the conduit valve.

Having described my invention I claim:

1. A liquid flow controller comprising, in combination with a conduit having a Venturi section, a reciprocating valve in said conduit, a stem fixed to said valve, means connected with said stem for balancing said valve, a chamber, a device dividing said chamber and fixed to said stem, and means comprising connections with said Venturi section and a different section of said conduit whereby said device is caused to move and adjust the position of said valve through the differential pressure communicated through said connections.

2. A liquid flow controller comprising, in combination with a conduit having a contracted section, valve mechanism in said conduit, a casing connected with said valve mechanism, said casing having a depending channel, a head in said casing, a part depending from said head and seated in said channel, and means for connecting opposite sides of said head with said contracted section and a different section of said conduit.

3. A liquid flow controller having, in combination with a conduit comprising a contracted section and a valve casing apart from said section, a reciprocating device fixed to said valve, a compartment in which said device reciprocates, and means for communicating pressure from said contracted section and a different section of said conduit to opposite sides of said device.

4. A liquid flow controller comprising, in combination with a conduit having a contracted section, a valve in said conduit apart from said section, a reciprocating member fixed to said valve, a compartment having chambers separated by said member, and means for connecting said chambers respectively with said contracted section and a different section of said conduit.

5. A liquid flow controller having, in combination with a conduit comprising a valve casing and a contracted section, a reciprocating valve in said casing apart from said section, a reciprocating device fixed to said valve and connected to said casing, said device receiving pressure on one side thereof from fluid in said casing, and means for communicating pressure from said contracted section to the other side of said device.

6. A liquid flow controller having, in combination with a conduit comprising a contracted section and a valve casing, a valve reciprocating in said casing, balancing means fixed to said valve, a device fixed to said stem and connected to said casing so as to receive on one side thereof liquid pressure from said casing, and means whereby liquid pressure is communicated from said contracted section to the other side of said device.

In witness whereof I have hereunto set my name this 21st day of October, A. D. 1908, in the presence of the subscribing witnesses.

JOHN W. LEDOUX.

Witnesses:
ROBERT JAMES EARLEY,
JOS. G. DENNY, JR.